C. BOUILLON.
PROCESS FOR DECOMPOSING SOAPY WATERS.
APPLICATION FILED JUNE 29, 1920.
1,410,882. Patented Mar. 28, 1922.
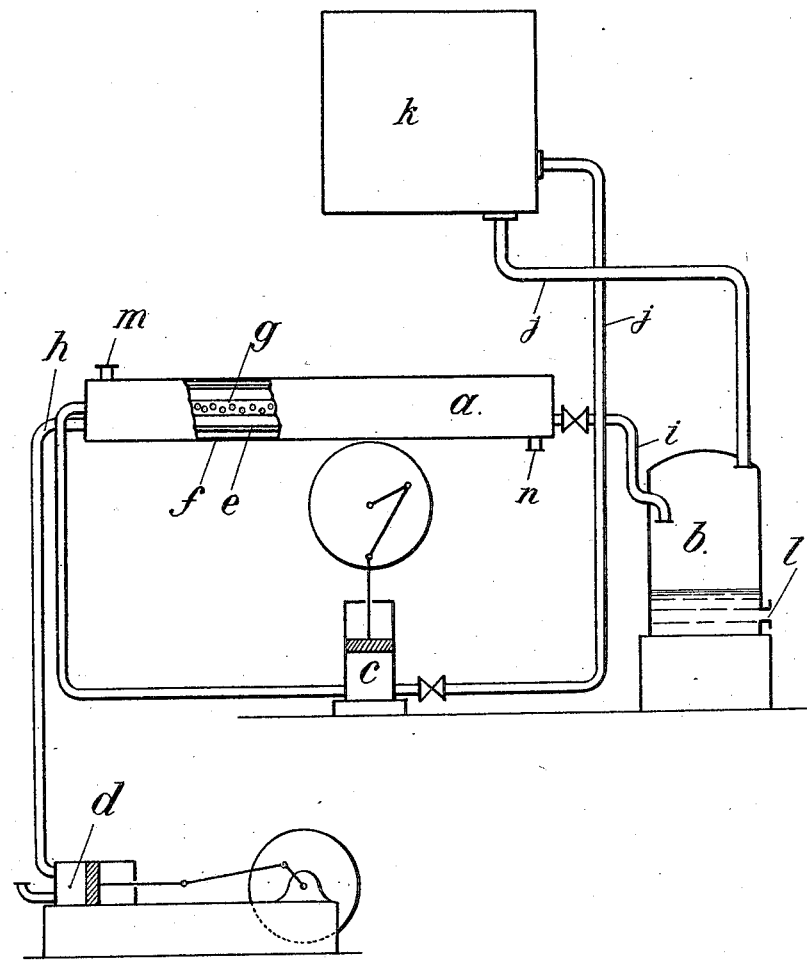
INVENTOR
Charles Bouillon
BY Townsend & Decker
ATTORNEYS

UNITED STATES PATENT OFFICE.

CHARLES BOUILLON, OF PARIS, FRANCE.

PROCESS FOR DECOMPOSING SOAPY WATERS.

1,410,882.  Specification of Letters Patent.  Patented Mar. 28, 1922.

Application filed June 29, 1920. Serial No. 392,875.

(GRANTED UNDER THE PROVISIONS OF THE ACT OF MARCH 3, 1921, 41 STAT. L., 1313.)

*To all whom it may concern:*

Be it known that I, CHARLES BOUILLON, of 106 Boulevard Haussmann, Paris, France, engineer, have invented a new and useful Process for Decomposing Soapy Waters, (for which I have filed application in France March 3, 1914, Patent No. 475,556,) process is fully set forth in the following specification.

This invention has for its object a process for decomposing soapy waters into their primary elements, viz. fatty acids and mineral salts.

According to this invention a soapy water is treated with carbonic acid. The soap is decomposed, the free fatty acid being liberated, while the mineral salt becomes dissolved in the water. Under pressure decomposition sets in rapidly, the rapidity of the action being greater if the operation takes place with heat and with continual agitation of the liquid to be decomposed so as to ensure constantly renewed contact between the liquid and the carbonic acid.

Under these conditions carbonic acid forms with the mineral salts in solution in the water carbonates and bicarbonates. The inverse reaction, viz. the reconstitution of the soapy matter is prevented by an excess of carbonic acid which maintains an acid medium in which the reaction cannot take place.

It is well to take precautions for preventing such reaction taking place when the operation is complete and for this purpose preventing the decomposition of the bicarbonate in the presence of the fatty acid obtained. Such decomposition can take place under the influence of heat after the separation of the excess of carbonic acid.

For this purpose at the termination of the operation the carbonic acid in solution is expanded to the atmospheric pressure which lowers the temperature of the mass and further allows the separation of the carbonic acid in excess and the liquid.

In this process the decomposition of the soapy waters may take place in a continuous manner in which case the process forms a true cycle; after expansion the carbonic acid is recovered and again compressed to react with still undecomposed waters.

Any suitable apparatus may be employed for carrying out the process.

An apparatus for carrying out the continuous process with the aid of heat is illustrated in elevation in the drawing.

The apparatus comprises a mixer $a$, a container $b$ in communication with a carbonic acid compressor $c$ and a pump $d$ compressing the soapy waters.

The mixer $a$ is formed in principle of a closed tube $e$ heated by steam led into a casing $f$ through the inlet $m$, $n$ being the outlet for condensed water; within the mixer is a tube $g$ provided with holes. The tube $e$ receives soapy liquid coming under the pressure of the pump $d$ through the pipe $h$; the tube $g$ receives carbonic acid compressed by the compressor $c$. The carbonic acid in expanding in the liquid mass mixes and agitates it continuously.

A container $b$ communicates both with the mixer $a$ through the pipe $i$ through which expansion takes place and also through the pipe $j$ with the suction of the carbonic acid compressor $c$. It is provided with an outlet $l$ for the fatty acid and the mineral solution.

The carbonic acid passes to the compressor $c$ from the reservoir $k$.

Of course the decomposition of the soapy waters may be effected in a discontinuous manner by successive operations without recovering the carbonic acid.

This process is more particularly applicable for the decomposition of residual soapy waters derived from washing wool which have been almost completely freed by a preliminary operation from the grease they contain; such waters contain a small quantity of residual grease, organic matters and mineral salts derived from washing wool.

The treatment with carbonic acid has the advantage of not attacking the organic matters, i. e. not oxidizing them as will take place when sulphuric acid or hydrochloric acid is employed. The employment of such acids gives rise to fatty acids contaminated with carboniferous matters which can only be removed by distillation. The treatment with carbonic acid produced on the contrary acids free from carboniferous matters. It is more advantageous to employ as mineral salt the carbonate corresponding to the base of the soap employed for the washing of the wool, such carbonate may be evaporated in a suitable furnace together with that derived from scouring, i. e. from the preliminary washing of the wool.

What I claim is:—

1. A process for the decomposing of soapy waters into fatty acids and mineral salts which consists in treating them directly with carbonic acid under pressure.

2. A process for the decomposing of soapy waters into fatty acids and mineral salts which consists in treating them directly with carbonic acid under pressure and expanding the carbonic acid after the completion of the reaction.

3. A process for the decomposing of soapy waters into fatty acids and mineral salts which consists in treating them directly with carbonic acid under pressure and with heat.

In testimony whereof I have signed this specification.

CHARLES BOUILLON.